W. D. ROWLSTONE.
Sleigh Brake.
No. 74,602.
Patented Feb. 18, 1868.
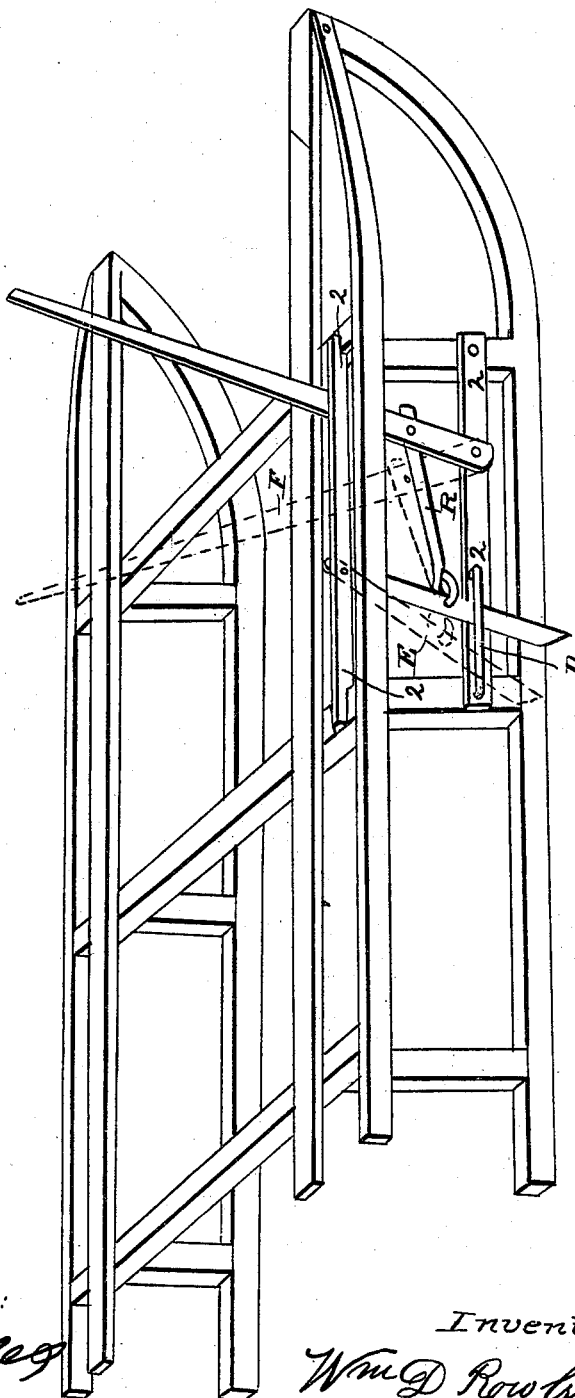

United States Patent Office.

WILLIAM D. ROWLSTONE, OF BUTTERNUTS, NEW YORK.

Letters Patent No. 74,602, dated February 18, 1868.

IMPROVEMENT IN SLEIGH-BRAKES.

The Schedule referred to in these Letters Patent and making part of the same.

TO ALL WHOM IT MAY CONCERN:

Be it known that I, WILLIAM D. ROWLSTONE, of the town of Butternuts, in the county of Otsego, and State of New York, have invented a new and useful article or machine, known as a Sleigh-Brake, for preventing cutters, sleighs, bob-sleighs, and all carriages upon runners, from slewing upon icy places, running too fast, or crowding teams when going down-hill; and also for holding said sleighs, &c., still at any point, for a team to rest when going up-hill; and do hereby declare that the following is a full, clear, and exact description of the construction and operation of the same, reference being had to the annexed drawings, making a part of this specification, in which—

Figure 1 is a perspective view of the sleigh, to the knees and beams of which the sash or frame of the brake (Figure 2) is firmly attached with iron bolts.

Letter A represents the lever to which the power, by the hand or foot of the driver, is applied, to bring down the dog or brake C (being attached to it by the connecting-rod B,) to its efficient working position, as seen in the drawing. The dotted lines E and F show the position of the lever and dog when at rest, or not in use. Letter D is an iron guard, to hold the dog C securely in its place. The dog C, I make of iron or steel. The lever A may be wood or iron. The said brake may be used on either or both sides of the sleigh, and when used upon bob-sleighs, I attach it to the back bobs, and use a longer connecting-rod or chain.

What I claim as my invention, and desire to secure by Letters Patent, is—

The above-named sleigh-brake, arranged substantially as above described and for the purposes herein mentioned.

WM. D. ROWLSTONE.

Witnesses:
WM. C. BENTLEY,
ENOS S. HALBERT.